US011562262B2

(12) United States Patent
Fujimoto et al.

(10) Patent No.: US 11,562,262 B2
(45) Date of Patent: Jan. 24, 2023

(54) MODEL VARIABLE CANDIDATE GENERATION DEVICE AND METHOD

(71) Applicant: TENSOR CONSULTING CO. LTD., Tokyo (JP)

(72) Inventors: Koji Fujimoto, Tokyo (JP); Kazutomo Shibahara, Tokyo (JP); Takashi Korekawa, Tokyo (JP)

(73) Assignee: TENSOR CONSULTING CO. LTD., Tokyo (JP)

( * ) Notice: Subject to any disclaimer, the term of this patent is extended or adjusted under 35 U.S.C. 154(b) by 728 days.

(21) Appl. No.: 16/494,582

(22) PCT Filed: Mar. 6, 2018

(86) PCT No.: PCT/JP2018/008465
§ 371 (c)(1),
(2) Date: Sep. 16, 2019

(87) PCT Pub. No.: WO2018/186090
PCT Pub. Date: Oct. 11, 2018

(65) Prior Publication Data
US 2020/0090058 A1 Mar. 19, 2020

(30) Foreign Application Priority Data
Apr. 6, 2017 (JP) .............................. JP2017-075790

(51) Int. Cl.
*G06N 5/04* (2006.01)
*G06N 20/00* (2019.01)
(52) U.S. Cl.
CPC ............... *G06N 5/04* (2013.01); *G06N 20/00* (2019.01)

(58) Field of Classification Search
CPC .......... G06N 5/04; G06N 20/00; G06F 17/30; G06F 16/00; G06Q 10/04; G06Q 40/025; G06Q 30/0201; G06Q 50/01
See application file for complete search history.

(56) References Cited

U.S. PATENT DOCUMENTS

2007/0124235 A1  5/2007  Chakraborty et al.
2007/0288105 A1  12/2007  Sekine et al.
(Continued)

FOREIGN PATENT DOCUMENTS

JP   2002-358411 A   12/2002
JP   2007-329415 A   12/2007
(Continued)

OTHER PUBLICATIONS

Tanioka, Hideo et al., "AI Technologies in Financial Business Industry", Journal of Japanese Society for Artificial Intelligence, vol. 17, No. 2, pp. 214-221, 2002.
(Continued)

*Primary Examiner* — Dave Misir
(74) *Attorney, Agent, or Firm* — Oliff PLC

(57) ABSTRACT

A model variable candidate generation device generating explanatory variable candidates to be used as candidates for an explanatory variable in generation of a prediction model includes: a data input unit inputting analysis data each entry having one or more items and the items having item values; a first item determination unit preliminarily setting properties of the items included in the analysis data as first item properties; a data property determination unit determining data properties being of the analysis data on the basis of the first item properties; a second item determination unit determining properties of the items included in the analysis data as second item properties on the basis of the data properties of the analysis data; and a variable candidate generation unit generating the explanatory variable candidates by selecting (Continued)

from the items or processing the items on the basis of the second item properties.

7 Claims, 9 Drawing Sheets

(56) References Cited

U.S. PATENT DOCUMENTS

| 2011/0276828 | A1 | 11/2011 | Tamaki et al. | |
|---|---|---|---|---|
| 2012/0173465 | A1* | 7/2012 | Hore | G06N 20/00 706/12 |
| 2017/0315960 | A1* | 11/2017 | Ochiai | G06F 17/17 |
| 2018/0060738 | A1* | 3/2018 | Achin | G06N 20/00 |
| 2018/0203918 | A1* | 7/2018 | Chen | G06F 16/9024 |
| 2018/0285772 | A1* | 10/2018 | Gopalan | G06N 20/00 |
| 2018/0314964 | A1* | 11/2018 | Takano | G06F 17/17 |
| 2019/0034945 | A1* | 1/2019 | Motohashi | G06Q 10/04 |

FOREIGN PATENT DOCUMENTS

| JP | 2008-158748 A | 7/2008 |
|---|---|---|
| JP | 2013-065084 A | 4/2013 |
| JP | 2013-152656 A | 8/2013 |
| JP | 2015-224389 A | 12/2015 |
| JP | 2016-004525 A | 1/2016 |
| JP | 6069460 B1 | 2/2017 |
| WO | 2010/082322 A1 | 7/2010 |

OTHER PUBLICATIONS

Fujino, Hidenori, "Analysis of Causal Relationship (1): Regression Analysis & Multiple Regression Analysis", Journal of Human Interface Society: human interface, vol. 15, No. 2, pp. 141-149, 2013.

Ueda, Taichiro, "A Function on Variable Selection in Discriminant Analysis and is Applications", Bulletin of the Computational Statistics of Japan, vol. 8, No. 2, pp. 171-175, 1996.

Fujimaki, Ryohei et al., "Challenge for Automation and Standardization of Analysis Process", Journal of Digital Practices, Information Processing Society of Japan, vol. 6, No. 3, pp. 198-206, 2016.

Jun. 12, 2018 International Search Report issued in International Application No. PCT/JP2018/008465.

Fessant et al., "Modelling Complex Data by Learning Which Variable to Construct," 2010, Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine Le, pp. 324-331.

Dec. 14, 2020 Extended Search Report issued in European Patent Application No. 18781829.9.

\* cited by examiner

Fig. 6

| ID | Gender | Date of birth | Income | Marriage |
|---|---|---|---|---|
| C001 | Male | 1965/2/8 | 12,000,000 | Married |
| C002 | Female | 1974/6/9 | 4,000,000 | Married |
| C003 | Male | 1981/12/20 | 5,800,000 | Married |
| C004 | Male | 1976/5/7 | 6,000,000 | Single |
| C005 | Female | 1992/8/7 | 2,400,000 | Single |
| C006 | | 1944/6/26 | 1,200,000 | Married |
| C007 | Male | 1956/1/31 | 6,000,000 | Married |
| C008 | Female | 1958/4/15 | 200,000 | Married |
| C009 | Female | 1968/10/12 | 1,000,000 | Married |
| C010 | Female | 2000/1/5 | 50,000 | Single |

Fig. 7

| ID | Family No. | Gender | Relationship | Income |
|---|---|---|---|---|
| C001 | 1 | Female | Spouse | 500,000 |
| C001 | 2 | Male | Child | |
| C002 | 1 | Male | Spouse | |
| C003 | 1 | Female | Spouse | |
| C003 | 2 | Female | Child | |
| C007 | 1 | Female | Spouse | 800,000 |
| C008 | 1 | Male | Spouse | 7,000,000 |
| C008 | 2 | Male | Parent | |
| C008 | 3 | Male | Child | 2,600,000 |
| C009 | 1 | Male | Spouse | 10,000,000 |

Fig. 8

| ID | Date of transaction | Business type of transaction store | Number of transactions | Transaction amount |
|---|---|---|---|---|
| C001 | 2016/12/1 | Restaurant | 6 | 20,000 |
| C001 | 2016/12/1 | Miscellaneous goods | 4 | 40,000 |
| C010 | 2016/12/1 | Department store | 4 | 30,000 |
| C005 | 2016/12/2 | Restaurant | 2 | 5,000 |
| C010 | 2016/12/4 | Supermarket | 2 | 500 |
| C004 | 2016/12/6 | Department store | 3 | 50,000 |
| C001 | 2016/12/7 | Restaurant | 4 | 15,000 |
| C010 | 2016/12/7 | Supermarket | 6 | 5,000 |
| C007 | 2016/12/8 | Department store | 3 | 15,000 |
| C005 | 2016/12/9 | Miscellaneous goods | 4 | 4,000 |
| C008 | 2016/12/16 | Restaurant | 3 | 3,000 |
| C010 | 2016/12/16 | Restaurant | 2 | 2,500 |
| C003 | 2016/12/17 | Leisure | 1 | 20,000 |
| C002 | 2016/12/20 | Department store | 6 | 60,000 |
| C008 | 2016/12/20 | Pachinko | | 20,000 |
| C002 | 2016/12/24 | Supermarket | 7 | 10,000 |
| C003 | 2016/12/28 | Leisure | 1 | 30,000 |
| C007 | 2016/12/28 | Miscellaneous goods | 4 | 6,000 |
| C009 | 2016/12/28 | Leisure | 1 | 15,000 |
| C003 | 2016/12/30 | Pachinko | | 10,000 |
| C010 | 2016/12/30 | Miscellaneous goods | 4 | 2,000 |
| C003 | 2016/12/31 | Supermarket | 5 | 8,000 |
| C007 | 2016/12/31 | Supermarket | 6 | 8,000 |

Fig. 9

| ID | Date of acquisition | Ages | Income | Marriage |
|---|---|---|---|---|
| C001 | 2016/12/31 | 51 | 12,000,000 | Married |
| C002 | 2016/12/31 | 42 | 4,000,000 | Married |
| C003 | 2016/12/31 | 35 | 5,800,000 | Married |
| C004 | 2016/12/31 | 40 | 6,000,000 | Single |
| C005 | 2016/12/31 | 24 | 2,400,000 | Single |
| C006 | 2016/12/31 | 72 | 1,200,000 | Married |
| C007 | 2016/12/31 | 60 | 6,000,000 | Married |
| C008 | 2016/12/31 | 58 |  | Married |
| C009 | 2016/12/31 | 48 | 1,000,000 | Married |
| C010 | 2016/12/31 | 16 | 50,000 | Single |

MODEL VARIABLE CANDIDATE GENERATION DEVICE AND METHOD

TECHNICAL FIELD

The present invention relates to extraction of variable candidates of a model used for data analysis.

BACKGROUND ART

A big data analysis technology of predicting the value of a desired prediction target by analyzing a relationship between a vast amount of collected and accumulated data is drawing attention. A model generated on the basis of accumulated data is used for calculating the value of a prediction target. When acquired data is input to a model as an explanatory variable, a prediction target is output as the value of an objective variable.

A model generation operation is a complicated operation which requires analysis of a vast amount of data. A portion of a model generation operation is automated by a computer so as to improve efficiency. Processes of selecting only highly effective variables from the variables included in data, discretizing the data, constructing a model from the data, and verifying the constructed model can be automated to some extent.

For example, PTL 1 discloses an information processing device capable of reducing the amount of computation performed when finding an explanatory variable to be added to a prediction model.

The information processing device disclosed in PTL 1 classifies a plurality of objective variables into a plurality of groups on the basis of an error between an actual value of each of a plurality of objective variables and a value calculated by a first prediction model for predicting the value of the objective variable, calculates a representative value of the errors using the errors calculated for an objective variable belonging to each of the plurality of groups, generates a plurality of second prediction models for predicting the calculated representative value for each of the plurality of groups while changing the explanatory variable, and determines an explanatory variable to be added to the first prediction model of the objective variable belonging to the group on the basis of a difference between the representative value and each of the values calculated by the generated plurality of second prediction models.

PTL 2 discloses a variable selection device that selects an explanatory variable to be used for constructing a model for calculating a probability that a specific variable has a specific value.

The variable selection device disclosed in PTL 2 counts the frequencies of samples in which objective variables have a first value and a second value as a first frequency and a second frequency, respectively, counts, for each explanatory variable, the frequency of samples in which an explanatory variable has the first value and an objective variable has the first value as a third frequency and the frequency of samples in which an explanatory variable has the first value and an objective variable has the second value as a fourth frequency, calculates feature amounts of the explanatory variables using the first and second frequencies and the third and fourth frequencies obtained for each explanatory variable, and selects one or more explanatory variables on the basis of the calculated feature amounts.

PTL 3 discloses a device capable of efficiently selecting explanatory variables.

In the device disclosed in PTL 3, when a linear predictor selects a desired explanatory variable from a plurality of explanatory variable candidates using a variable selection model represented by the sum of a constant term and a linear combination of a plurality of explanatory variable candidates and a plurality of coefficients corresponding to the plurality of explanatory variable candidates, the linear predictor acquires sign conditions for at least one coefficient among the plurality of coefficients, calculates an estimated value of the plurality of estimated values and an estimated value of the constant term under the sign conditions using a plurality of pieces of data, and selects an explanatory variable candidate corresponding to a coefficient of which the estimated value is calculated to be non-zero as the desired explanatory variable.

PTL 4 discloses a data analysis system that generates a prediction model for predicting an objective variable with high accuracy.

The data analysis system disclosed in PTL 4 generates a prediction model for predicting an objective variable from a plurality of explanatory variables on the basis of learning data, calculates a reliability indicating probability of prediction based on the prediction model for each record, creates a subset made up of records of which the reliability is within a predetermined range among a plurality of records, extracts a combination of explanatory variables having high correlation with the objective variable from the plurality of explanatory variables on the basis of the records belonging to the subset, and adds the extracted combination of explanatory variables to the learning data as new explanatory variables.

CITATION LIST

Patent Literature

[PTL 1]
  Japanese Patent Application Publication No. 2013-152656
[PTL 2]
  Japanese Patent Application Publication No. 2008-158748
[PTL 3]
  Japanese Patent No. 6069460
[PTL 4]
  Japanese Patent Application Publication No. 2016-4525

SUMMARY OF INVENTION

Technical Problem

With change in information communication environment such as development of SNS (Social Networking Service) and IoT (Internet of Things), when the use of big data is regularized, the number of types of collected data and the number of items included in the data will increase dramatically. Moreover, the types of collected data and the items included in the data will change frequently.

If the number of pieces and the amount of data become enormous, a situation in which a large part of the items of data serving as the candidates for explanatory variables when generating a model for predicting a certain objective variable is little correlated with the objective variable may occur.

The technologies disclosed in PTL 1 to 4 are technologies of selecting a highly effective explanatory variable for predicting an objective variable with high accuracy from explanatory variable candidates prepared in advance according to a predetermined algorithm operation.

However, in a situation in which a large part of the items of data serving as explanatory variable candidates is little correlated with an objective variable, if all items of all pieces of data are used as the explanatory variable candidates without taking the properties of data and items, it is difficult to select explanatory variables appropriately and to generate a highly accurate model. When a highly accurate model is to be generated, it is desirable that explanatory variable candidates are exhaustive, and it is also required that the candidates are narrowed down to some extent by taking the relation between explanatory variables and objective variables based on properties of data and items into consideration.

Therefore, an operation of generating appropriate candidates for explanatory variables to be input to an algorithm operation of selecting an explanatory variable among a vast number of items of data is required. However, in a present state, a method of generating valid candidates for explanatory variables is not established but is performed based on human experience.

When the use of big data is regularized, if an operation of narrowing down a vast amount of data which changes frequently relies on a human operation, the human operation may be a bottleneck, creating a possibility that updating of model is delayed and prediction accuracy of an objective variable decreases.

An object of the present invention is to provide a technology for generating candidates for variables of a model in advance during data analysis.

Solution to Problem

A model variable candidate generation device according to an aspect of the present invention is a model variable candidate generation device that generates explanatory variable candidates to be used as candidates for an explanatory variable in generation of a prediction model, the device including: a data input unit, a first item determination unit, a data property determination unit, a second item determination unit, and a variable candidate generation unit.

The data input unit that inputs analysis data in which each entry has one or more items and the items have item values. The first item determination unit that preliminarily sets properties of the items included in the analysis data as first item properties. The data property determination unit that determines data properties which are properties of the analysis data on the basis of the first item properties of the items included in the analysis data. The second item determination unit that determines properties of the items included in the analysis data as second item properties on the basis of the data properties of the analysis data. The variable candidate generation unit that generates the explanatory variable candidates by selecting from the items or processing the items on the basis of the second item properties of the items included in the analysis data.

Advantageous Effects of Invention

Explanatory variable candidates are generated according to such a step-by-step procedure that properties of items of analysis data are set preliminarily, the properties of the analysis data are determined on the basis of the preliminarily set item properties, the item properties are determined formally on the basis of the properties of the analysis data, and the explanatory variable candidates are generated on the basis of the determined item properties. Therefore, since the basis for decision is not present in the analysis data, it is possible to determine the properties of the analysis data and the respective items for which mechanical determination was difficult and to narrow down the variables of a prediction model in data analysis quickly by taking the analysis data and the items into consideration.

BRIEF DESCRIPTION OF DRAWINGS

FIG. 6 is a diagram illustrating an example of master data.

FIG. 7 is a diagram illustrating another example of master data.

FIG. 8 is a diagram illustrating an example of transaction data.

FIG. 9 is a diagram illustrating an example of snapshot data.

DESCRIPTION OF EMBODIMENTS

An embodiment of the present invention will be described with reference to the drawings.

Figure 1:
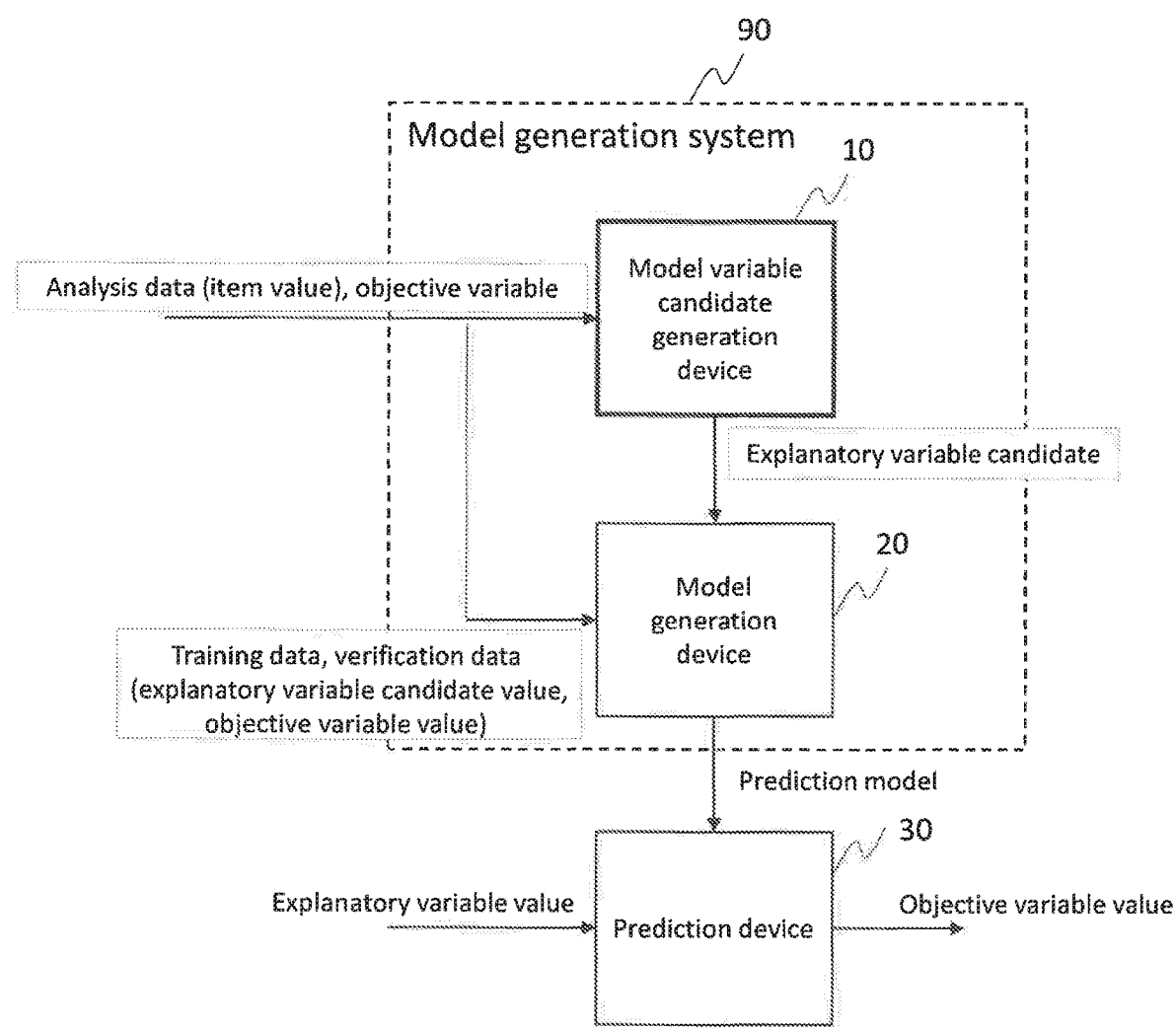
FIG. 1 is a block diagram of a model generation system.

FIG. 1 is a block diagram of a model generation system.

A model generation system 90 is a system that performs machine learning using analysis data and generates a prediction model that enables prediction of an objective variable. The analysis data is data related to an analysis target (not illustrated) and is data acquired actually as an example. The analysis data includes one or more entries. Each entry is made up of a plurality of items. Machine learning requires data having a large volume to some extent. Data having a large volume including a plurality of entries may be provided as analysis data, and data having a relatively small volume of the same item configuration may be provided as the analysis data. An item value is filled in each item for respective entries. An objective variable is an item to be predicted by a prediction model and is a variable of which the prediction value is generated by a prediction model.

Referring to FIG. 1, the model generation system 90 includes a model variable candidate generation device 10 and a model generation device 20. The model variable candidate generation device 10 and the model generation device 20 are devices realized when a computer executes a software program as an example. The model variable candidate generation device 10 and the model generation device 20 may be implemented on physically different computers and may be implemented on the same computer.

The model variable candidate generation device 10 receives analysis data and objective variables as an input and outputs explanatory variable candidates to be used as candidates for explanatory variables when generating a prediction model for predicting an objective variable. The explanatory variable candidates are candidates for explanatory variables to be input to a prediction model. In order to enhance prediction accuracy of the prediction model, it is desirable to exclude variables having no influence on the objective variable and to extract candidates for explanatory variables which may have influence on the objective variable exhaustively. The explanatory variable is selected among explanatory variable candidates. The explanatory variable candidates are provided to the model generation device 20.

Training data and verification data are provided to the model generation device 20. The training data is data provided for machine learning for predicting a prediction model. The verification data is data prepared separately from the training data in order to evaluate performance of a prediction model. The training data and the verification data are data selected among pieces of analysis data or generated by processing the analysis data. The training data and the verification data include a plurality of entries. Each entry is made up of a plurality of items. An item value is filled in each item for respective entries. Each item of the training data and the verification data includes an explanatory variable and/or an objective variable. Since evaluation of the performance of a prediction model machine-learned by training data is not essential, it is not necessary to prepare verification data if evaluation is not necessary.

The model generation device 20 receives training data including an explanatory variable candidate value and an objective variable value as an input and generates a prediction model. The prediction model is provided to a prediction device 30.

The prediction device 30 is a device realized when a computer executes a software program as an example. The prediction device 30 receives an explanatory variable value or source data thereof as an input, calculates an objective variable value using the prediction model, and outputs an objective variable value as a prediction result.

Figure 2:
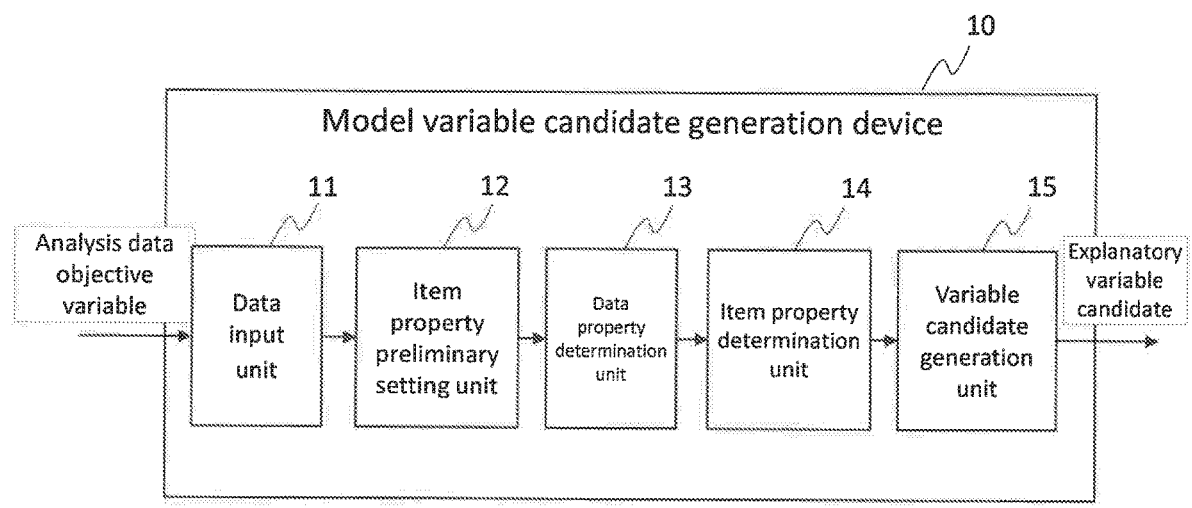
FIG. 2 is a block diagram of a model variable candidate generation device according to the present embodiment.

FIG. 2 is a block diagram of a model variable candidate generation device according to the present embodiment.

Referring to FIG. 2, the model variable candidate generation device 10 includes a data input unit 11, an item property preliminary setting unit 12, a data property determination unit 13, an item property determination unit 14, and a variable candidate generation unit 15.

The data input unit 11 receives given analysis data and inputs the analysis data to the model variable candidate generation device 10. The analysis data has a plurality of entries and includes a plurality of items for each entry, and each item has an item value. The details of the analysis data will be described later.

The item property preliminary setting unit 12 preliminarily sets properties of items included in the analysis data. In this example, the item property preliminary setting unit 12 determines and sets item properties of such an extent that can be determined on the basis of the name and format of an item and a domain knowledge. The properties of analysis data can be determined by grasping the properties of each item of the analysis data from the name and format of an item and a domain knowledge to some extent.

Determination of item properties includes not only a case in which a computer determines and sets item properties by an arithmetic process, but also a case in which a user corrects and sets the item properties determined by the computer, and a case in which a user determines and sets item properties. The item properties set preliminarily are referred to as first item properties.

The data property determination unit 13 determines data properties which are properties of analysis data on the basis of the first item properties of the items included in the analysis data and the domain knowledge. Data properties are features of data which enable various pieces of data to be classified into a plurality of categories.

Determination of data properties includes a case in which a computer determines and sets data properties by an arithmetic process, a case in which a user corrects and sets the data properties determined by the computer, and a case in which a user determines and sets properties of some data.

The item property determination unit 14 determines properties of items included in the analysis data on the basis of the data properties of the analysis data determined by the data property determination unit 13. In this case, the item property determination unit 14 may use the item properties preliminarily set by the item property preliminary setting unit 12 or meta-information. Here, determination of item properties indicates determining which value is filled in the item. The item properties determined herein are referred to as second item properties. Moreover, determination of item properties may include determining a relation between a plurality of items.

The variable candidate generation unit 15 generates explanatory variable candidates by selecting explanatory variable candidates from items or processing the items on the basis of the second item properties of the items included in the analysis data.

As described above, in the present embodiment, explanatory variable candidates are generated according to such a step-by-step procedure that properties that can be determined from the names and formats of items of analysis data are set preliminarily, the properties of the analysis data are determined on the basis of the preliminarily set item properties, the item properties are determined formally on the basis of the properties of the analysis data, and the explanatory variable candidates are generated on the basis of the determined item properties. Therefore, since the basis for decision is not present in the analysis data, it is possible to determine the properties of the respective items for which mechanical determination was difficult and to reduce the number of manual operations required for generating explanatory variable candidates in model generation. As a result, it is possible to narrow down the variables of a prediction model in data analysis quickly.

In the present embodiment, the first item properties are specific item features indicating the features of specific items, the data properties are data structure classifications that classify the analysis data according to a data structure, and the second item properties are item content features indicating the content features of an item. In this way, since the content features of items can be grasped by analyzing the contents of items in such a step-by-step procedure that features of specific items are determined, and pieces of data are classified according to a data structure that can be grasped from the features of the specific items, and the content features of items included in the data are determined according to the data structure of the data, it is possible to extract explanatory variable candidates appropriately.

The item property preliminary setting unit 12 determines items having the specific item features on the basis of the item format. The item format mentioned herein includes an item name described in the meta-information.

Specific items include an item that identifies an analysis target, an item other than the item that identifies the analysis target and that identifies that the item is not an analysis target, and an item indicating a time when an entry is registered. When it is possible to grasp an item in which identification information of an analysis target is stored, an item in which identification information of any other information is stored, and an item indicating a time when an entry is registered, it is possible to estimate a data structure and to proceed data classification.

The data property determination unit 13 determines a data structure classification of analysis data on the basis of the specific item features and the domain knowledge.

In this case, the data structure classification includes master data which is data provided in advance, transaction data which is data acquired using occurrence of a predetermined event as a trigger, and snapshot data which is data acquired using arrival of a predetermined time point as a trigger. When a data structure such as master data, transaction data, and snapshot data is known, it is possible to promote estimation of items included in the analysis data and to improve determination accuracy of item properties.

The item property determination unit 14 determines item content features of an item on the basis of an item format, a data structure classification of data, and the domain knowledge. The item format mentioned herein includes an item name described in the meta-information. More specifically, the item property determination unit 14 classifies items into major classifications on the basis of the item format and further classifies the items into minor classifications indicating the item content features on the basis of the data structure classification and the domain knowledge. Since items are classified into minor classifications indicating content features after the items are classified into major classifications on the basis of the format, it is possible to easily determine the content features of items.

Furthermore, the item property determination unit 14 further classifies items into minor classifications on the basis of a relationship between items in addition to the data structure classification and the domain knowledge. Since the relationship between items is used for estimating the content properties of items, it is possible to further promote estimation of content features of items.

Figure 3:
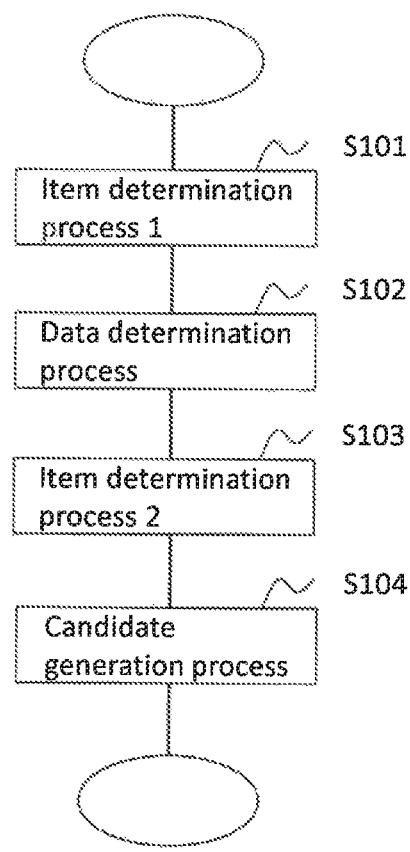
FIG. 3 is an overall flowchart of an entire model variable candidate generation process according to the present embodiment.

FIG. 3 is an overall flowchart of an entire model variable candidate generation process according to the present embodiment. Hereinafter, the model variable candidate generation process executed by the model variable candidate generation device 10 will be described in detail.

Analysis objective information, analysis data and meta-information thereof, and domain knowledge information are input to the model variable candidate generation device 10.

The analysis objective information includes elements that determine an analysis policy of analysis data. Specifically, an analysis target ID (identification information), an objective variable, and a reference date are included.

The analysis target ID is identification information for identifying analysis target units individually. For example, when analysis is performed in units of persons who are credit card subscribers and occurrence of a certain event such as withdrawal inability due to insufficient funds is predicted, an analysis target unit is a person who is a credit card subscriber. In this case, the analysis target ID is set for respective persons. Moreover, when analysis is performed in units of transactions and occurrence of a certain event is predicted, the analysis target unit is a transaction. In this case, the analysis target ID is set for respective transactions.

A format in which the analysis target ID is provided to the model variable candidate generation device 10 is not particularly limited. For example, a file that lists the analysis target IDs of a plurality of analysis targets may be input to the model variable candidate generation device 10. Alternatively, it may be designated such that an analysis target ID is recorded in a certain item of certain analysis data input to the model variable candidate generation device 10. Moreover, the analysis target ID may be expressed by a combination of a plurality of pieces of information.

An objective variable is a variable indicating a value to be predicted by a prediction model. For example, when occurrence of an event such as withdrawal inability due to insufficient funds is predicted, the presence of occurrence of withdrawal inability may be set to an objective variable. The objective variable is set such that a value is determined uniquely for an analysis target.

A reference date is a date for setting up to which date and time of data will be used for analysis such as generation of a prediction model or prediction of a prediction target state using a prediction model. For example, by generating a prediction model using the data up to a certain reference date as analysis data, setting the reference date again, and inputting values to an explanatory variable from the data up to the new reference date, it is possible to calculate an objective variable as a prediction result.

For example, a probability of occurrence of an event such as withdrawal inability may be calculated by generating a prediction model that outputs a probability of occurrence of an event such as withdrawal inability as an objective variable using the analysis data acquired up to a certain reference date, acquiring values of explanatory variables from the data of a new reference date for the prediction model, and inputting the values to the prediction model.

A reference date is set to be determined uniquely for a prediction target. When data acquired up to a present time point is input to a prediction model to predict an event, since the present time point is the reference date and all pieces of acquired data are used for generating the prediction model, it is not necessary to set the reference date.

A format in which the reference date is provided to the model variable candidate generation device 10 is not particularly limited. For example, a file that lists the reference dates of respective prediction targets may be input to the model variable candidate generation device 10. Alternatively, a reference date calculation method (a data processing method) may be designated to the model variable candidate generation device 10. Specifically, it may be designated such that the date and time of the last date of the year and month registered in a certain item of certain analysis data is the reference date.

The analysis data is various pieces of data used for analysis. In the present embodiment, data having such a format that is designated by rows and columns such as a CSV format is used as analysis data. Rows correspond to entries and columns correspond to items. The analysis data may include meta-information. For example, an item name of each item, a description of each item, information indicating a relationship between items, a data format, a character string length, and the like may be described in the meta-information. A plurality of pieces of analysis data may be input to the model variable candidate generation device 10. However, the format or the structure of the analysis data is not particularly limited. The analysis data may be data of which the structure is not clearly determined such as a HTML file of a Web page as long the items can be extracted.

The domain knowledge information is information in which domain knowledge is accumulated. The domain knowledge is a matter known to experts in an area (a target area) of a target to which the prediction model generated by the model generation system 90 is applied and includes matters peculiar to the target area, for example. By assuming the domain knowledge, it is possible to make specific inference and determination in the target area. In the present embodiment, information on the domain knowledge related to the analysis data is provided to the model variable candidate generation device 10. Examples of the domain knowledge include an item individual knowledge indicating properties of individual items such as attributes and/or a distribution trend of values that can be stored in the items of the analysis data and an inter-item knowledge indicating a relationship between items.

An example of the item individual knowledge of the domain knowledge includes an age distribution of loan applicants and a distribution of usage limits of credit cards. When an age distribution of loan applicants is known in advance as the domain knowledge, the item property preliminary setting unit 12 or the item property determination unit 14 can estimate that if the distribution of values stored in a certain item is similar to the age distribution, the ages of loan applicants are stored in the item.

Another example of the item individual knowledge of the domain knowledge includes a relation between an item name and the properties of the item. In a target area, if it is known in advance that a value filled in an item having a certain item name indicates specific properties, it is possible to easily estimate the properties of an item from the item name. For example, if it is known in advance that an item of which the item name is "digestibility" has a value of 0% to 100%, it is possible to easily estimate the range of values filled in the item from the item name of "digestibility".

An example of the inter-item knowledge of the domain knowledge includes the trend of a data structure. If a data structure which is frequently used in a target area is known in advance, it is possible to estimate a data structure using the trend and to estimate the properties of another item included in the same analysis data from the properties of a certain item.

As another example of the inter-item knowledge of the domain knowledge, if there are two items filled with numerical values and a magnitude relation between the numerical values of these items is known in advance, it is possible to specify respective items on the basis of a magnitude relation between the numerical values when the analysis data includes two items having a numerical value format.

In the model variable candidate generation device 10, the item property preliminary setting unit 12, the data property determination unit 13, the item property determination unit 14, or the variable candidate generation unit 15 can improve the determination accuracy using the domain knowledge. There are various kinds of domain knowledge depending on a target area. The domain knowledge of various areas may be accumulated in advance in the model variable candidate generation device 10, and an operator who generates a prediction model may designate and use the domain knowledge of a target area of the prediction model.

<Item Determination Process 1>

Referring to FIG. 3, first, the item property preliminary setting unit 12 executes item determination process 1 with respect to the respective items of analysis data (step S101). With item determination process 1, it is possible to determine the properties of each item of the analysis data to such an extent that the properties of the analysis data can be determined. In item determination process 1, item properties indicating the properties of values filled in each item is determined and a certainty factor of the determination is determined.

In the present embodiment, the item property preliminary setting unit 12 determines whether a target item is an item in which a value indicating a predetermined matter including an analysis target ID, other ID, a registration period (a date and time of registration and the date of registration) is filled on the basis of the name and the format of the target item.

The analysis target ID is identification information for identifying analysis targets individually. The other ID is identification information for identifying matters other than the analysis target individually. The registration period (the date and time of registration or the date of registration) is the date or the day when an entry is additionally registered in analysis target data. If the analysis target ID, the other ID, and the registration period included in the analysis target data can be known, it is possible to determine the properties of analysis target data.

Figure 4:
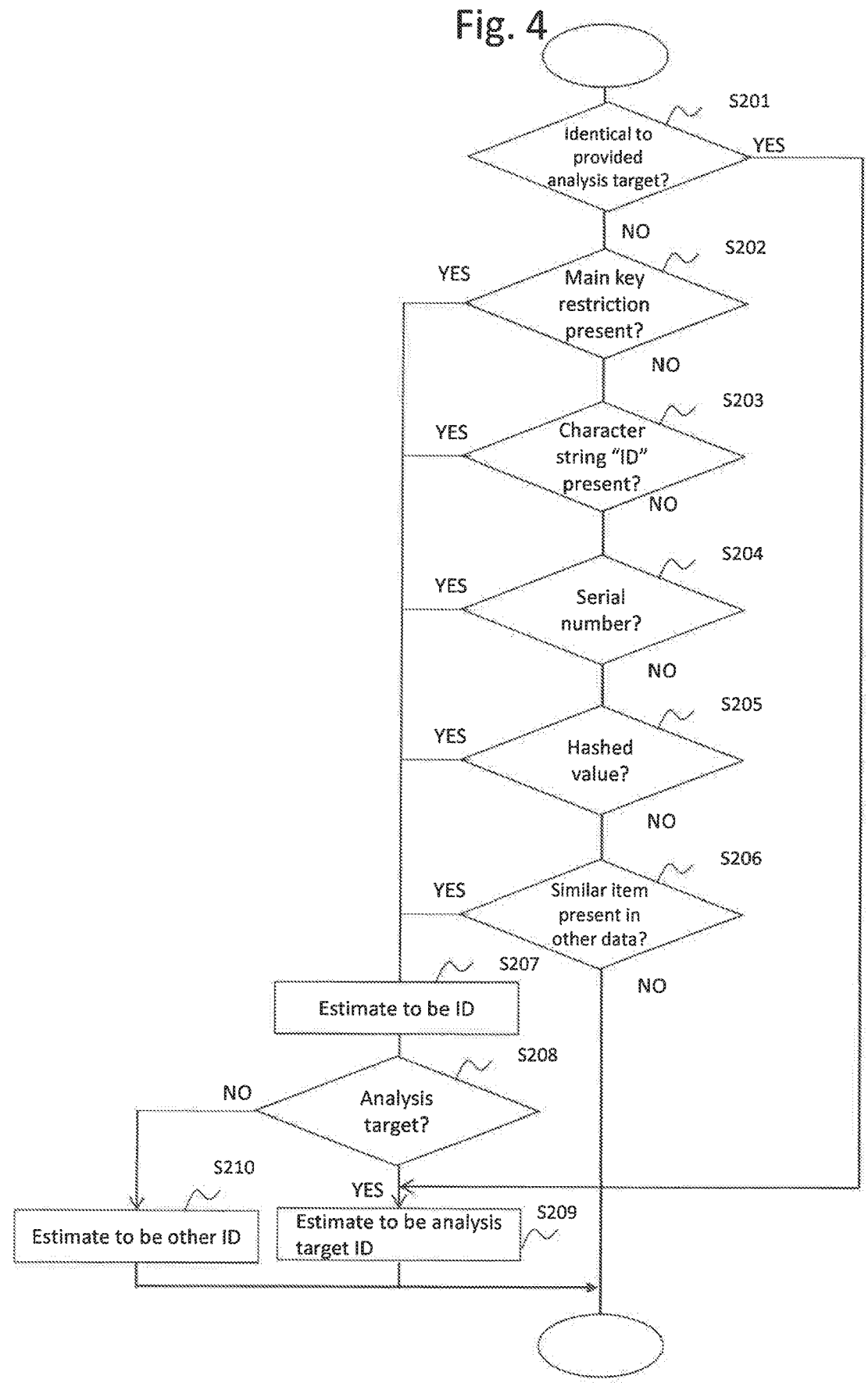
FIG. 4 is a flowchart of a process of determining whether a target item is an item in which ID is filled.

FIG. 4 is a flowchart of a process of determining whether a target item is an item in which ID is filled.

First, the item property preliminary setting unit 12 compares a value filled in the target item with a value of the analysis target ID provided in advance as analysis objective information (step S201). When the value of the target item and the value of analysis target ID provided in advance have a certain extent of identity or more, the item property preliminary setting unit 12 estimates that the target item is an item of the analysis target ID (step S209).

When the value of the target item and the value of the analysis target ID provided in advance do not have a certain extent of identity or more, the item property preliminary setting unit 12 determines whether a main key restriction is applied to the target item (step S202). When a main key restriction is applied to the target item, the item property preliminary setting unit 12 estimates that the target item is an item in which ID is filled (step S207).

When a main key restriction is not applied to the target item, the item property preliminary setting unit 12 determines whether a character string of "ID" is included in an item name of the meta-information (step S203). When a character string of "ID" is included in the item name of the meta-information, the item property preliminary setting unit 12 estimates that the target item is an item in which ID is filled (step S207).

When a character string of "ID" is not filled in the item name of the meta-information, the item property preliminary setting unit 12 determines whether a value filled in the target item is a serial number (step S204). When the value filled in the target item is a serial number, the item property preliminary setting unit 12 estimates that the target item is an item in which ID is filled (step S207).

When the value filled in the target item is not a serial number, the item property preliminary setting unit 12 determines whether the value filled in the target item is a hash value (step S205). This is because a hashed item is highly likely to be an ID. If the character string of the value in an item is expressed with characters representing hexadecimal numbers of 0 to 9 and A to F, and the occurrence rates of the respective hexadecimal numbers at the respective positions in the character string are equal, it can be estimated that the value of the item is a hash value. If the value filled in the target item is a hash value, the item property preliminary setting unit 12 estimates that the target item is an item in which ID is filled (step S207).

When the value filled in the target item is not a hash value, the item property preliminary setting unit 12 determines whether an item similar to the target item is present in another analysis data (step S206). Similarity between items can be determined by comparing character string lengths, characters being used, and appearing character strings, and the like. An ID is often used as a key for coupling analysis data with another analysis data. In this case, the ID will present in common to a plurality of pieces of analysis data.

Therefore, it can be estimated that an item present in common to a plurality of pieces of analysis data is highly likely to be an ID. When an item similar to the target item is present in another analysis data, the item property preliminary setting unit 12 estimates that the target item is an item in which ID is filled (step S207).

When it is estimated in step S206 that the target item is an ID, the item property preliminary setting unit 12 determines whether the ID filled in the target item is an ID of the analysis target (step S208). For example, if a character string indicating the analysis target is included in the item name of the target item, it can be estimated that the ID filled in the target item is an ID of the analysis target. The character string indicating the analysis target includes the name, the abbreviation, the acronym, the English translation, and the like of the analysis target.

If the ID filled in the target item is the ID of the analysis target, the item property preliminary setting unit 12 estimates that the target item is an item of the analysis target ID (step S209). If the ID filled in the target item is not the ID of the analysis target, the item property preliminary setting unit 12 estimates that the target item is an ID of a matter other than the analysis target (step S210).

In this way, it is possible to estimate whether the target item is an analysis target ID or another ID. In the present embodiment, the item property preliminary setting unit 12 estimates the certainty factor that the target item is an analysis target ID or another ID.

The item property preliminary setting unit 12 assigns a certainty factor in advance to each of steps S201 to S206 of FIG. 4. In this example, certainty factor A is assigned to step S201, certainty factor B is assigned to step S202, certainty factor C is assigned to step S203, certainty factor D is assigned to step S204, certainty factor E is assigned to step S205, and certainty factor F is assigned to step S206. When the analysis target is determined to be an ID in the process of determining whether the target item is an item in which ID is filled in FIG. 4, the item property preliminary setting unit 12 determines a certainty factor depending on whether YES is obtained in any one of the steps of S201 to S206. For example, if a main key restriction is applied to the target item, since YES is obtained in step S202 and the target item is determined to be an item in which ID is filled, the certainty factor of the determination is B. Moreover, although a main key restriction is not applied to the target item, if a character string of "ID" is included in the item name of the target item, since YES is obtained in step S203 and the target item is determined to be an item in which ID is filled, the certainty factor of the determination is C.

In this example, as illustrated in FIG. 4, although the determination processes of steps S201 to S206 are performed sequentially such that the determination of the next step is executed when NO is obtained in the previous step, the present invention is not limited thereto.

As another example, all determination processes corresponding to the steps S201 to S206 may be performed for the target item, and whether the target item is an item in which ID is filled may be determined comprehensively using all determination results. In this case, a score may be assigned to the determination processes corresponding to steps S201 to S206, and the sum of the scores of the determination processes where YES is obtained may be used as the certainty factor that the target item is an item in which ID is filled.

Next, a process of determining whether a target item is an item in which a date of registration is filled will be described.

Figure 5:
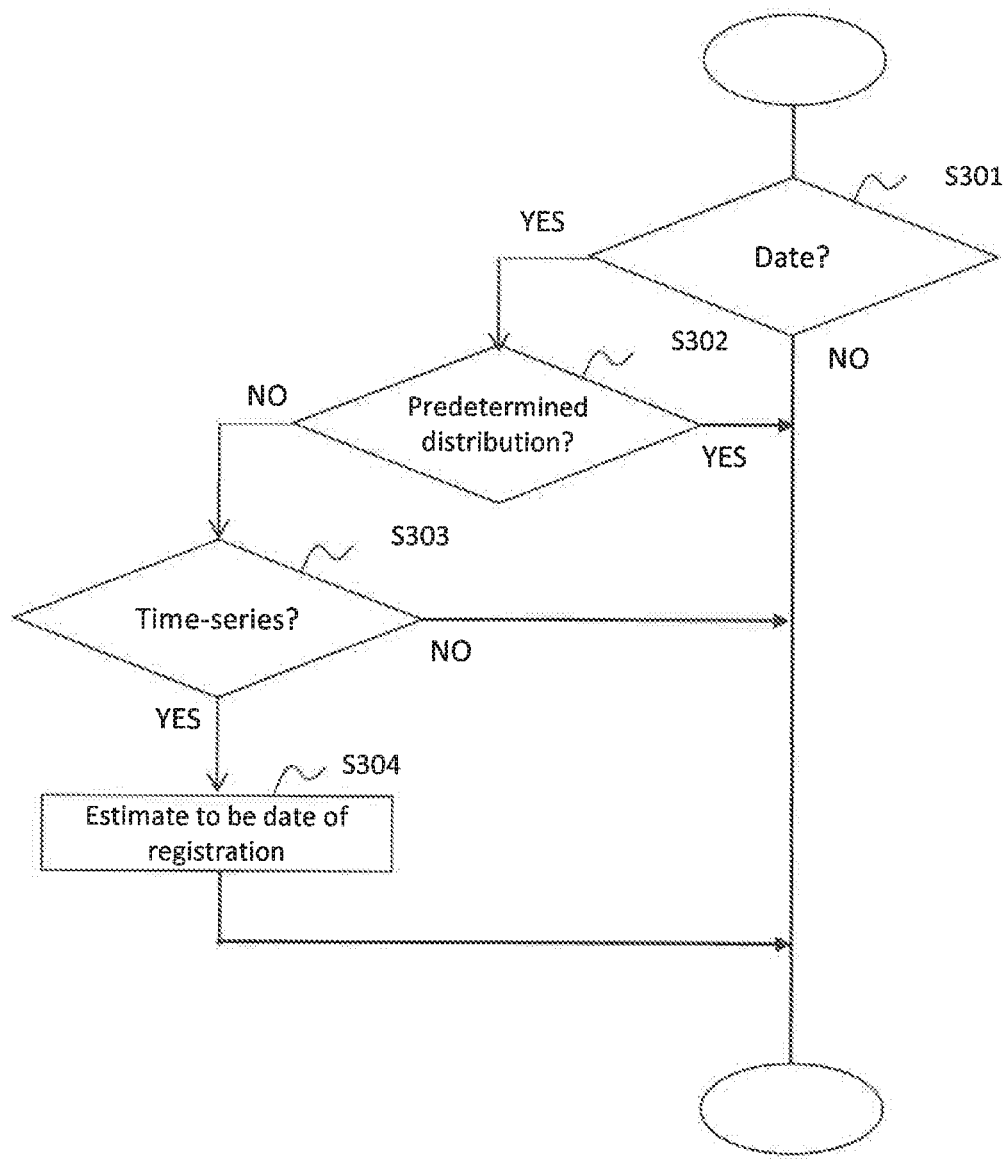
FIG. 5 is a flowchart of a process of determining whether a target item is an item in which the date of registration is filled.

FIG. 5 is a flowchart of a process of determining whether a target item is an item in which the date of registration is filled.

First, the item property preliminary setting unit 12 determines whether the format of a target item is a date format (step S301). When the format of the target item is a date format, the item property preliminary setting unit 12 determines whether a distribution of dates filled in the target item is similar to a predetermined distribution (step S302). Step S302 is a process of eliminating date items of which the distribution is known in advance as a domain knowledge. For example, if a distribution of the dates of birth of the analysis target is known in advance as a domain knowledge, it is estimated that a date item similar to the distribution of the dates of birth is not the date of registration.

If the distribution of dates of the target item is not similar to the distribution of a date item to be eliminated, the item property preliminary setting unit 12 determines whether the date and time of the target item is time-series data (step S303). If the date and time of the target item is time-series data, the item property preliminary setting unit 12 estimates that the target item is an item in which the date of registration is filled (step S304).

Although an example of a process of determining whether the target item is an item in which the date of registration is filled has been illustrated, similar determination can be made for other items. Moreover, although date items other than the objective of which the distribution is known in advance are eliminated in step S302, there is no limitation thereto. If the distribution of objective date items is known in advance as a domain knowledge, the distribution of the dates of the target item may be compared with the distribution of the objective date items and it may be estimated that the target item is an item in which an objective date is filled if the distributions are similar.

A plurality of possibilities may be presented to a target item. For example, it may be estimated that a target item is likely to be an analysis target ID with a certain certainty factor and is likely to be another ID with a certain certainty factor.

With the above-described processes, if the items of an analysis target ID, another ID, and the registration period can be known among the items of the analysis data, it is possible to determine the properties of the analysis target data to be described later.

<Data Determination Process>

Returning to FIG. 3, subsequently, the data property determination unit 13 determines the properties of analysis data on the basis of the properties of items set (determined) preliminarily in step S101 and the domain knowledge in step S102. In the present embodiment, a data structure of analysis data is determined as a specific process of determining the properties of analysis data. A data structure is classified into master data, transaction data, and snapshot data. Other classifications may be used. The master data, the transaction data, and the snapshot data have the respective features, and the respective pieces of data can be identified using the respective features. Moreover, the data property determination unit 13 determines a key with which the entries of a plurality of pieces of analysis data can be associated with each other.

(Master Data)

Master data is data in which fixed or semi-fixed information on a certain target is registered. An example of the master data includes list data in which various attributes of a credit card subscriber are registered.

FIG. 6 is a diagram illustrating an example of master data. FIG. 6 illustrates an example of one-to-one-correspondence master data having such features that one entry is registered for a certain target. Referring to FIG. 5, identification information (ID) and attribute information of a target are registered in each entry of the master data. In the example of FIG. 5, a target is a credit card subscriber, for example, a gender and the date and time of birth are registered as fixed attribute information of the credit card scriber, and income and marriage attributes are registered as semi-fixed attribute information. Analysis data in which ID appears once is likely to be one-to-one-correspondence master data.

FIG. 7 is a diagram illustrating another example of master data. FIG. 7 illustrates an example of one-to-N-correspondence master data in which a plurality of entries are registered for a certain target. Referring to FIG. 7, identification information (ID) and the other information related to a target are registered in each entry of the master data. In the example of FIG. 7, although the target is a credit card subscriber as in the example of FIG. 6, information on the family rather than the credit card subscriber is registered in the master data. Therefore, a family member number (No.) is used as an ID for identifying one or more entries (entries of respective family members) of which the ID of the credit card subscriber which is the target is the same. The credit card subscriber may not have any family member.

For example, referring to FIG. 6, a credit card subscriber of ID=C001 is a male, and referring to FIG. 7, the credit card subscriber of ID=C001 has a spouse and one child. The spouse has a family No. of 1 and is a female and earns an income of 500,000 yens. The child has a family No. of 2 and is a male and has no income. A case where no income is registered includes a case where income information is not acquired and a case where the family member has no income. Moreover, referring to FIG. 6, although a credit card subscriber of ID=C004 is registered, the credit card subscriber has no family member referring to FIG. 7.

(Transaction Data)

Transaction data is data acquired using occurrence of a certain event as a trigger. Generally, transaction data has an item of an occurrence period (the date and time of registration or the date of occurrence) of an event. The occurrence period (the date and time of occurrence or the date of occurrence) of an event corresponds to the registration period (the date and time of registration or the date of registration).

FIG. 8 is a diagram illustrating an example of transaction data. FIG. 8 illustrates an example of transaction data acquired using occurrence of a predetermined event for a certain target as a trigger. Referring to FIG. 8, a target ID and the date and time of occurrence of an event, and the other information are registered in each entry of transaction data. In the example of FIG. 8, the target is a credit card subscriber, and attribute information of events acquired using an event of using a credit card as a trigger is registered. The attribute information of an event includes a business type of transaction store, the number of transactions, and a transaction amount. The business type of transaction store is information indicating the business type of a store where the credit card was used. The number of transactions is information indicating the number of goods paid with the credit card. The transaction amount is information on the amount of money paid with the credit card. The transaction data includes a target ID and the date of occurrence (the date of registration) of an event, and has such features that the same ID appears a plurality of times, and entries are registered in the order of the time-series dates of occurrence of events. However, there is a possibility that the entries are sorted again and are not arranged in the order of dates of occurrence.

For example, referring to the entry at the top of FIG. 8, an entry indicating that a credit card subscriber of ID=C001 paid 20,000 yens for six goods in a restaurant on Dec. 1, 2016, with a credit card is registered.

(Snapshot)

Snapshot data is data acquired using arrival of a predetermined time point as a trigger. Generally, snapshot data has such features that the data is acquired at predetermined time intervals. Moreover, in many cases, when a predetermined time point is reached, data is acquired at the same period for a plurality of targets, which is one of the features of snapshot data. Therefore, entries are added to the snapshot data repeatedly at regular time points. Moreover, a plurality of entries are added in the same period.

FIG. 9 is a diagram illustrating an example of snapshot data. FIG. 9 illustrates an example of snapshot data in which attribute information of a target acquired for respective targets using the arrival of Dec. 31, 2016 as a trigger is stored. Specifically, attribute information such as the age, the income, and the marriage of each credit card subscriber is acquired.

The data property determination unit 13 determines a data structure of analysis data using the features of each data structure based on the domain knowledge and the preliminarily set properties of items of the analysis data. In this case, the data property determination unit 13 may use human-corrected information of the properties of items output by the item property preliminary setting unit 12 as the preliminarily set properties of items of the analysis data.

(Data Structure Determination Process)

Although a method of a process of determining a data structure is not particularly limited, several methods will be described.

The data property determination unit 13 may construct a data structure determination model in which analysis data and the preliminarily set properties of each item of the analysis data are used as explanatory variables, and a data structure is used as an objective variable by machine learning as an example, and the data property determination unit 13 may determine the data structure of analysis data using the model. The data structure determination model can be constructed by applying a correct answer to a data structure of learning data and performing machine learning. In machine learning, an operation may be performed by taking the certainty factor of determination on the preliminarily set item properties. Moreover, if it is known in advance as a domain knowledge that an appropriate determination criterion changes depending on a situation, the determination criterion may be changed depending on a situation according to the domain knowledge during the machine learning. For example, models for respective situations may be constructed, and a model may be switchably used depending on a situation.

As another example, a data structure determination rule may be created using an empirical rule of human, and the data property determination unit 13 may determine a data structure of analysis data using the rule. In rule creation, a certainty factor of determination may be taken into consideration in determination of the preliminarily set item properties. Moreover, if it is known in advance as a domain knowledge that an appropriate determination criterion changes depending on a situation, the determination criterion may be changed depending on a situation according to the domain knowledge during the rule creation. For example, rules for respective situations may be constructed, and a rule may be switchably used depending on a situation.

The machine-learning-based model construction and the empirical rule-based rule creation may be used in combination. For example, the empirical rule-based rule creation may be applied to portions in which a rule can be created with a high certainty factor according to the empirical rule, and the machine-learning-based model construction may be applied to portions in which it is difficult to create rules according to the empirical rule. The data property determination unit 13 may use rules and models appropriately switchably.

The data property determination unit 13 may determine a key with which entries of a plurality of pieces of analysis data are associated.

The properties of the respective items of the analysis data can be determined by the result of the above-described data determination process.

<Item Determination Process 2>

Returning to FIG. 3, subsequently, in step S103, the item property determination unit 14 determines the properties of the respective items of analysis data on the basis of the properties of the analysis data determined by the data property determination unit 13.

In determination of the properties of items of analysis data, first, the item property determination unit 14 classifies the items into major classifications according to the format thereof. For example, the items are classified into numerical values, categories, date and time, and date, and the like. Furthermore, the item property determination unit 14 classifies the items into minor classifications on the basis of the domain knowledge and the properties of the analysis data. In this case, an item that is likely to be included in analysis data of a certain data structure, a format of a value filled in the item, a range of values that can be filled in the item, a distribution of the values of the item, and a magnitude relation between the value of the item and the value of another item, and the like are used as the domain knowledge. When these kinds of domain knowledge are used, the classification of the item can be narrowed down by the data structure, the value format, and the value distribution.

For example, when the item indicates a numerical value, the item can be further finely classified into an age, the amount of money, the number of cases, a percentage, and the like, for example. When the item indicates a category, the item can be further finely classified into an ID, a classification level (major classification, medium classification, minor classification, or the like), and the like, for example. When the item indicates a date and time or a date, the item is further finely classified into the date of birth, an expiration date, and the like. The classifications illustrated in herein are examples only and other classifications may be used.

The properties of an item may be determined from a relationship between items. Therefore, in the present embodiment, the item property determination unit 14 uses the relationship between items in determining the properties of an item in addition to the properties of a single item of analysis data. In this case, it is effective to use the relationship between items in determination of the properties of an item together with the domain knowledge.

For example, although there are two items having a date format, and it is estimated that one is a date indicating the date of registration and the other is a date indicating an expiration date, when it is difficult to determine which one is the date of registration and which one is the expiration date, if a specific magnitude relation between the date of registration and the expiration date is known as the domain knowledge, it is possible to determine which one is the date of registration and which one is the expiration date on the basis of the magnitude relation.

A magnitude relation that a credit limit is not more than the balance may be known in advance as a domain knowledge. Moreover, if there are items indicating categories, a fact that a hierarchical inclusion relation such as a major classification or a medium classification is satisfied for the items may be known as a domain knowledge. These kinds of domain knowledge may be used in determining the properties of items.

A distribution serving as the basis of an occurrence frequency may be known in advance for respective minor classifications on the basis of a domain knowledge. In this case, a distribution of values included in items of analysis data is compared to the base distribution to obtain the degree of similarity, and the classification of items is narrowed down on the basis of the degree of similarity. For example, a distribution of expiration dates of credit cards is a predetermined distribution which has a small bias depending on a year, a season, a month, a day, or the like, and in which a future date later than the present date by predetermined years is not present.

A fact that values have a magnitude relation between two minor classifications may be known in advance. For example, it is known in advance that the expiration date of a credit card is later than the issuance date of the credit card. A magnitude relation of base values between minor classifications may be obtained on the basis of a domain knowledge, and a classification can be narrowed down by comparing a magnitude relation of values between items with a base magnitude relation. For example, a case in which it is desired to further narrow down a plurality of items having been narrowed down to a plurality of minor classifications such that one of two items is the expiration date of a credit card and the other item is the issuance date of a credit card will be considered. In such a case, since the expiration date of a credit card is later than the issuance date of a credit card, the item of the expiration date of a credit card has a larger value than the item of the issuance date of a credit card. In this manner, the possibilities of respective items can be further narrowed down from the magnitude relation of values between items.

In addition, it is possible to narrow down the classifications of items in detail by selecting and using an appropriate domain knowledge act the format of the item values.

In the present embodiment, the item property determination unit 14 further calculates a certainty factor of determination of item properties. For example, the item property determination unit 14 may assign a score of a certainty factor to each of determination conditions of item classifications and integrate the scores of the corresponding determination conditions to calculate the certainty factor.

<Candidate Generation Process>

Returning to FIG. 3, subsequently, the variable candidate generation unit 15 generates explanatory variable candidates in step S104.

The variable candidate generation unit 15 uses items which can be explanatory variables of a prediction model for calculating a desired objective variable as explanatory variable candidates on the basis of the item properties of the analysis data determined by the item property determination unit 14 in step S103, a relationship between items, and a domain knowledge. For example, it is known as a domain knowledge that a predetermined item (a candidate item) classified into a predetermined parameter which is considered to have an influence on an objective variable is present.

When the item property determined by the item property determination unit 14 corresponds to the candidate item, the item may be used as an explanatory variable candidate. Moreover, it is known in advance as a domain knowledge that a predetermined item classified into an attribute of a prediction target is highly likely to have an influence on an objective variable. In this case, an item determined to represent the attribute of the prediction target may be used as an explanatory variable candidate.

Moreover, an item of which the certainty factor of the item property determination by the item property determination unit 14 in step S103 is equal to or smaller than a predetermined value may not be used as an explanatory variable candidate. This is because, even if it is determined according to the domain knowledge that an item is considered to have an influence on an objective variable, if the other probability is sufficiently high, the item may be excluded from the explanatory variable candidate.

Specific examples (determination examples) of the item properties determination by the item property determination unit 14 and the explanatory variable candidate determination by the variable candidate generation unit 15 associated therewith will be described below.

Determination Example 1

The item property determination unit 14 may estimate that an item of which the number of appearing item values is equal to or larger than a predetermined number of types (a lower-limit threshold) and is equal to or smaller than a predetermined number of types (an upper-limit threshold) among the items included in the master data is an observation target attribute item indicating an attribute of an observation target, and the variable candidate generation unit 15 may use the item estimated to be the observation target attribute item as an explanatory variable candidate. Since an appropriate lower-limit threshold and an appropriate upper-limit threshold change according to a target area or a data amount of the analysis data, the lower-limit threshold and the upper-limit threshold may be set appropriately. Since an item indicating the attribute of a limited number of observation targets may roughly classify the observation targets according to the properties thereof and be effective explanatory variables of a prediction model, the item may be used as an explanatory variable candidate. For example, if an observation target is a person, master data is highly likely to have items such as an age and a gender, and the age and the gender may be an explanatory variable of a prediction model. However, whether it is appropriate to make such determination may be determined in advance by taking a domain knowledge of a target area into consideration. It is not necessary to use all items having a high appearance frequency among the items of master data in all areas as the variable candidates.

Determination Example 2

The item property determination unit 14 may estimate that an item of which the number of appearing item values is equal to or larger than a predetermined number of types and is equal to or smaller than a predetermined number of types among the items included in transaction data is an event attribute item indicating an attribute of an event, and the variable candidate generation unit 15 may use the item estimated to be the event attribute item as an explanatory variable candidate. Furthermore, since an item indicating the attribute of a limited number of events may roughly classify the events according to the properties thereof and be effective explanatory variables of a prediction model, the item may be used as an explanatory variable candidate similarly to this example. The event attribute item may include an item indicating at least one of the cause, the details thereof, and the result of the event, and the state of an observation target when the event occurred. Since the cause, the details thereof, and the result of the event, or the state of an observation target when the event occurred classifies events, an item indicating at least one of them may be an effective descriptive variable when there is a strong relation between an event and an observation target.

Determination Example 3

The item property determination unit 14 may estimate that an item of which the number of appearing item values is equal to or larger than a predetermined number of types and is equal to or smaller than a predetermined number of types among the items included in the snapshot data is an observation target state item indicating the state of an observation target, and the variable candidate generation unit 15 may use the item estimated to be the observation target state item as an explanatory variable candidate. Furthermore, since an item indicating the state of a limited number of observation targets may roughly classify the states of the observation target according to the properties thereof and be effective explanatory variables of a prediction model, the item may be used as an explanatory variable candidate similarly to this example.

Determination Example 4

The item property determination unit 14 may determine item individual properties which are item properties represented by an individual item of the analysis data which is master data and inter-item properties which are item properties representing a mutual relation between items, and the variable candidate generation unit 15 may generate the explanatory variable candidate by processing the items on the basis of the data properties, the item individual properties, and the inter-item properties. Since the individual properties and the mutual relation are determined for respective items, and explanatory variable candidates are generated on the basis of the individual properties and the mutual relation, it is possible to list explanatory variable candidates appropriately from various properties of respective items.

Determination Example 5

The item property determination unit 14 may extract a key item that uniquely specifies respective entries of analysis data, a non-sequence category item indicating classifications in which values do not have sequencing properties, and a sequence category item indicating classifications in which values have sequencing properties from the items included in the analysis data which is master data and may use the attributes of these items as item individual properties, and the variable candidate generation unit 15 may use the item individual properties in generation of explanatory variable candidates. Classifications in which values do not have sequencing properties are classifications in which a magnitude relation between values does not have a special meaning. An example of the non-sequence category item is a house number of an address. Classifications in which values have sequencing properties are classifications in which a magnitude relation between values has a special meaning.

An example of the sequence category item is an age. The variable candidate generation unit 15 may use items corresponding to the specific key item as explanatory variable candidates, for example. Moreover, one or both of the non-sequence category items and the sequence category items may be used as explanatory variable candidates.

Determination Example 6

Both or one of the item property preliminary setting unit 12 and the item property determination unit 14 may be given, in advance, existing item distribution information indicating a distribution of the values of existing items and may determine item properties of determination target items by comparing a distribution of values of determination target items which are items serving as determination targets of analysis data with the distribution of the values of existing items in the existing item distribution information. For example, an item having a distribution similar to a general age distribution can be estimated to be an age item. In addition to this, items such as the usage limit of a credit card can be estimated.

Determination Example 7

The item property determination unit 14 may extract an item of which the number of item values is equal to or larger than a predetermined number of types in analysis data in which the number of entries is equal to or larger than a predetermined threshold defined by a data structure as a candidate item, and the variable candidate generation unit 15 may use items corresponding to the candidate item as explanatory variable candidates. If there are many entries, since items having a large number of types of appearing values can be used as explanatory variables, contributing to improvement in accuracy of an objective variable, such items may be used as explanatory variable candidates. Since the number of entries in which an item can be an effective explanatory variable can be estimated on the basis of the properties of an item to some extent, when appropriate thresholds are set with respect to a target area and a data structure, it is possible to appropriately select a certain item having a sufficient number of entries. However, in the case of an item in which the number of types of item values is larger than the number of entries such that the number of types of item values is substantially equal to the number of entries, there is a possibility that an influence of the item on an objective variable is not extracted. Therefore, the item property determination unit 14 may use an item in which the number of item values is equal to or larger than a predetermined number of types (a lower-limit threshold) and is equal to or smaller than a predetermined number of types (an upper-limit threshold) in analysis data in which the number of entries is equal to or larger than a predetermined threshold defined by a data structure as a candidate item, and the variable candidate generation unit 15 may use items corresponding to the candidate item as explanatory variable candidates.

Determination Example 8

The item property determination unit 14 may an item of which the item value is within a predetermined numerical value range among the items of the data of a predetermined data structure as a candidate item and the variable candidate generation unit 15 may use items corresponding to the candidate item as explanatory variable candidates. By setting conditions of a data structure and a range of item values of items that are to be used as explanatory variable candidates, it is possible to extract items satisfying the conditions as explanatory variable candidates.

In the present embodiment, although an example in which explanatory variable candidates are selected from items of analysis data has been mainly described, the present invention is not limited thereto. The variable candidate generation unit 15 may generate explanatory variable candidates using the properties of each item determined by the item property determination unit 14 and may process items to generate explanatory variable candidates rather than using the items as explanatory variable candidates as they are.

For example, the variable candidate generation unit 15 may create combination variables obtained by combining a certain variable with other variables exhaustively, calculate the degree of relevancy with an objective variable for the obtained various combination variables, and use a predetermined number of combination variables having higher degrees of relevancy as explanatory variable candidates. Moreover, the variable candidate generation unit 15 may create another combination variables obtained by further combining other variables with combination variables obtained by combining a certain variable with other variables exhaustively and generate explanatory variable candidates by narrowing down the combination variables according to the degree of relevancy with the objective variable similarly to the above example.

The above-described embodiment of the present invention is an example for illustrating the present invention, and it is not intended to restrict the scope of the present invention to the embodiment only. Those skilled in the art may implement the present invention in various other modes without departing from the spirit of the present invention.

REFERENCE SIGNS LIST

10 Model variable candidate generation device
11 Data input unit
12 Item property preliminary setting unit
13 Data property determination unit
14 Item property determination unit
15 Variable candidate generation unit
20 Model generation device
30 Prediction device
90 Model generation system

The invention claimed is:

1. A model variable candidate generation device that generates explanatory variable candidates to be used as candidates for an explanatory variable in generation of a prediction model, the device comprising:
a processor configured to perform:
inputting analysis data in which each entry of the analysis data has one or more items and each of the one or more items have item values;
preliminarily setting properties of the one or more items included in the analysis data as first item properties, the first item properties being specific item features indicating the features of a specific item;
determining data properties which are properties of the analysis data on the basis of the first item properties of the one or more items included in the analysis data, the analysis data properties being data structure classifications that classify the data according to a data structure, the data structure classifications being determined on the bases of the specific item features and a domain knowledge;

determining properties of the one or more items included in the analysis data as second item properties on the basis of the data properties of the analysis data, the second item properties being item content features indicating the content features of the one or more items; and generating the explanatory variable candidates by selecting from the one or more items or processing the one or more items on the basis of the second item properties of the one or more items included in the analysis data, wherein each data structure classification includes master data which is predetermine data, transaction data which is data acquired using occurrence of a predetermined event as a trigger, and snapshot data which is data acquired using arrival of a predetermined time point as a trigger.

2. The model variable candidate generation device according to claim 1, wherein, in the inputting analysis step, the processor determines an item having the specific item features on the basis of a format of the item.

3. The model variable candidate generation device according to claim 2, wherein the specific item includes an item that identifies an analysis target, an item that identifies an item that is not the analysis target, or an item that indicates a time when the entry is registered.

4. The model variable candidate generation device according to claim 1, wherein the processor determines the item content features of the one or more items on the basis of a format of the one or more items, each data structure classification of the analysis data, and the domain knowledge.

5. The model variable candidate generation device according to claim 4, wherein the processor classifies the one or more items into major classifications on the basis of the format of the one or more items and further classifies the one or more items into minor classifications indicating the item content features on the basis of each data structure classification and the domain knowledge.

6. The model variable candidate generation device according to claim 5, wherein the processor further classifies the one or more items into the minor classifications on the basis of a relationship between the one or more items in addition to each data structure classification and the domain knowledge.

7. A model variable candidate generation method for generating explanatory variable candidates to be used as candidates for an explanatory variable in generation of a prediction model, the method comprising:

inputting, by a processor, analysis data in which each entry of the analysis data has one or more items and each one of the one or more items have item values;

preliminarily setting, by the processor, properties of the one or more items included in the analysis data as first item properties, the first item properties being specific item features indicating the features of a specific item;

determining, by the processor, data properties which are properties of the analysis data on the basis of the first item properties of the one or more items included in the analysis data, the analysis data properties being data structure classification that classify the data according to a data structure, the data structure classifications being determined on the basis of the specific item features and a domain knowledge;

determining, by the processor, properties of the one or more items included in the analysis data as second item properties on the basis of the data properties of the analysis data, the second item properties being item content features indicating the content features of the one or more items; and generating, by a processor, the explanatory variable candidates by selecting from the one or more items or processing the one or more items on the basis of the second item properties of the one or more items included in the analysis data, wherein each data structure classification includes master data which is predetermined data, transaction data which is data acquired using occurrence of a predetermined event as a trigger, and snapshot data which is data acquired using arrival of a predetermined time point as a trigger.

* * * * *